United States Patent [19]
Harasawa

[11] Patent Number: 5,950,232
[45] Date of Patent: Sep. 7, 1999

[54] FETCHING APPARATUS FOR FETCHING DATA FROM A MAIN MEMORY

[75] Inventor: Akio Harasawa, Tokyo, Japan

[73] Assignee: NEC Corporation, Tokyo, Japan

[21] Appl. No.: 08/684,622

[22] Filed: Jul. 22, 1996

[30] Foreign Application Priority Data

Jul. 21, 1995 [JP] Japan ................................ 7-185250

[51] Int. Cl.⁶ .................................................. G06F 12/02
[52] U.S. Cl. ......................... 711/202; 711/203; 711/205; 711/206; 711/207
[58] Field of Search ............................... 711/1, 2, 6, 101, 711/208, 202, 203, 205, 206, 207

[56] References Cited

U.S. PATENT DOCUMENTS

| | | | |
|---|---|---|---|
| 3,909,798 | 9/1975 | Wallach et al. | 711/203 |
| 3,976,978 | 8/1976 | Patterson | 711/208 |
| 4,403,283 | 9/1983 | Myntti | 711/3 |

FOREIGN PATENT DOCUMENTS

WO88 3292   5/1988   WIPO .

OTHER PUBLICATIONS

K.J. Thurber, "Programmable indexing networks", *Proceedings of the Spring Joint Computer Conference*, May 5–7, 1970, pp. 51–58.

*Primary Examiner*—Eddie P. Chan
*Assistant Examiner*—Than V. Nguyen
*Attorney, Agent, or Firm*—Sughrue, Mion, Zinn, Macpeak & Seas, PLLC

[57] ABSTRACT

A fetching apparatus (20) is for use in a data processing equipment comprising a processor (11) and a main memory (12). The main memory has a page structure comprising a plurality of pages each of which has a plurality of page data. The fetching apparatus is located between the processor and the main memory. The fetching apparatus fetches the page data of a specific one of the pages as fetched page data from the main memory and supplies the fetched page data to said processor. The fetching apparatus comprises a plurality of registers (23-1 to 23-K) each of which is for memorizing the fetched page data. A table section (24) is for memorizing addresses corresponding the page data in each of the page. The table section further memorizes, as data transfer locations, the memory areas corresponding to the addresses. In response to the specific page, a reading section (25) reads the page data of the specific page out of the main memory as read page data with reference to the table section to fetch the read page data as the fetched page data to a specific one of the registers in accordance with a specific one of the data transfer locations.

6 Claims, 2 Drawing Sheets

FETCHING APPARATUS FOR FETCHING DATA FROM A MAIN MEMORY

BACKGROUND OF THE INVENTION

This invention relates to a fetching apparatus for fetching data from a main memory to supply the data to a central processing unit and, more particularly, to a fetching apparatus for use in processing data at a high speed.

In general, an information or data processing equipment comprises a central processing unit or a processor and a main memory. The main memory may comprise a plurality of memory areas each of which has a predetermined memory size. Each of the memory areas is for memorizing a plurality of data as memorized data. Each of the memory areas may be called a page.

In such a data processing equipment, a cache or buffer memory may be located between the processor and the main memory in order to carry out a memory access at a high speed. In the case where the processor needs a particular data memorized in the main memory, the cache memory fetches, as a fetched page data block, a content of a page including the particular data. In order to obtain the particular data, the processor accesses the cache memory instead of the main memory.

In a data processing apparatus, the processor may need an additional data which is not in includes in the fetched page data block. The cache memory again fetches, as an additional fetched page data block, a content of an additional page including the additional data. In order to obtain the additional data, the processor accesses the cache memory.

As described above, it is necessary for the cache memory to frequently carry out a fetching operation when the fetched page data block does not include the data which the processor needs. In cases where the cache memory frequently carries out the fetching operation, it is difficult to carry out the data access at the high speed.

Furthermore, the cache memory has a memory capacity for the fetched page data block. The fetched page data block may have unused data. Taking the unused data into consideration, it is necessary to determine the memory capacity. It is difficult to effectively use the cache memory.

SUMMARY OF THE INVENTION

It is therefore an object of this invention to provide a fetching apparatus capable of carrying out a data access at a high speed.

It is another object of this invention to provide a fetching apparatus capable of effectively using a memory area.

Other objects of this invention will become clear as the description proceeds.

On describing the gist of this invention, it is possible to understand that a fetching apparatus is for use in a data processing equipment comprising a main memory and a processor. The main memory has a page structure comprising a plurality of pages each of which memorizes a plurality of page data. The fetching apparatus is located between the main memory and the processor to fetch the data of a specific one of the pages as fetched page data from the main memory and to supply the fetched page data to the processor.

According to this invention, the fetching apparatus comprises memory means having a plurality of memory areas each of which is for memorizing the fetched page data, table means for memorizing addresses corresponding to the page data in each of the pages and for memorizing, as data transfer locations, the memory areas corresponding to the addresses, and reading means responsive to the specific page for reading the page data of the specific page out of the main memory as read page data with reference to the table means to fetch the read page data as the fetched data to a specific one of the memory areas in accordance with the transfer locations.

DESCRIPTION OF THE PREFERRED EMBODIMENT

Figure 1:
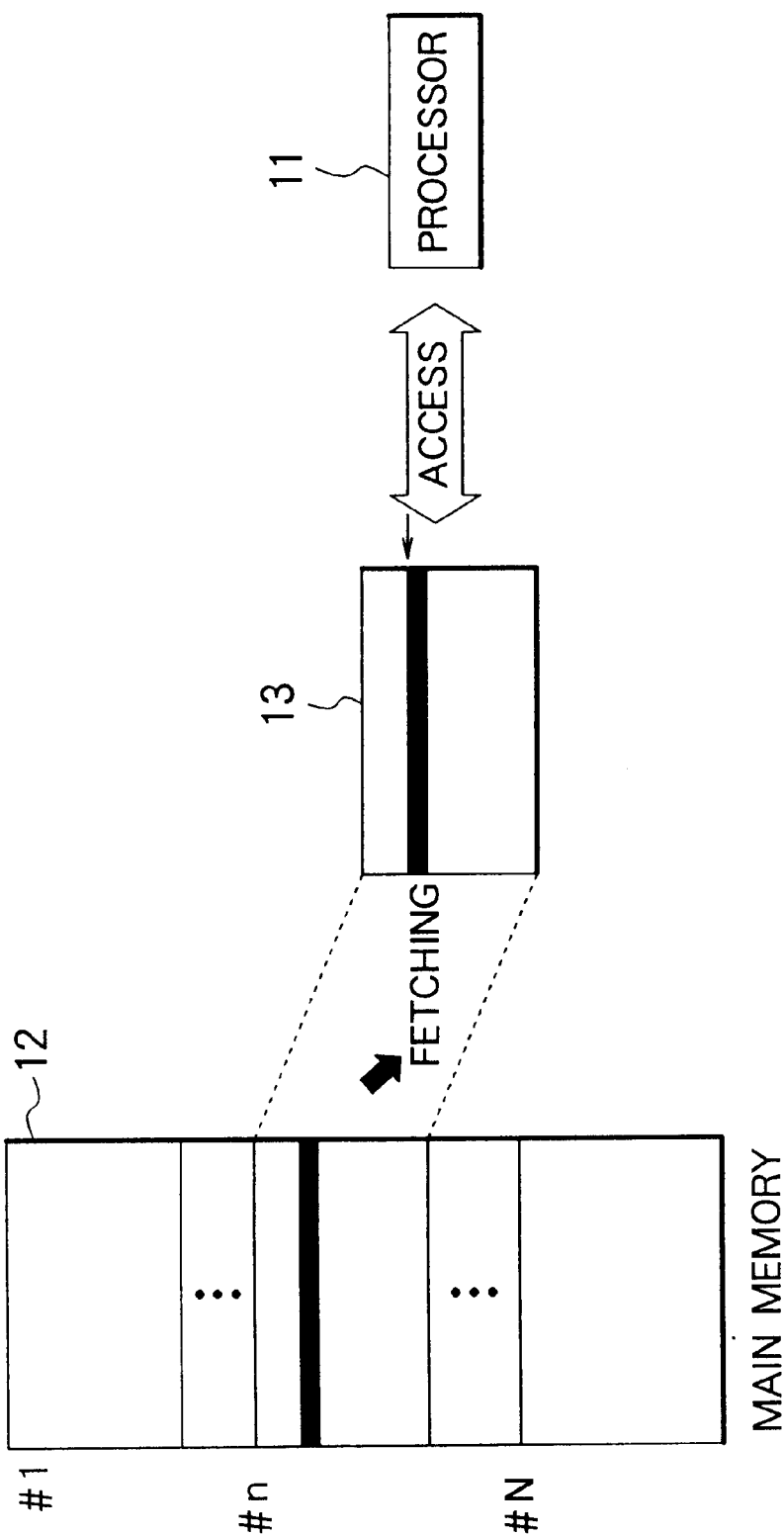
FIG. 1 shows a view for describing a fetch operation of a conventional fetching apparatus.

Referring to FIG. 1, a conventional fetching apparatus will be described at first in order to facilitate an understanding of this invention. The fetching apparatus may be for use in a data processing system comprising a processor 11 and a main memory 12. The fetching apparatus comprises a cache memory 13 located between the processor 11 and the main memory 12. The main memory 12 has a page structure comprising a plurality of pages each of which memorizes a plurality of page data. More particularly, the main memory 12 has first through N-th pages #1 to #N, where N represents a positive integer which is greater than one. Each of the first through the N-th pages has page data in the number of M, where M represents a positive integer which is greater than one. The cache memory 13 has a capacity corresponding to one page.

It will be assumed that the processor 11 needs a particular page data including a specific one of the first through the N-th pages. The specific page may be, for example, the first page. In this event, the content of the first page is fetched in the cache memory 13. The processor 11 accesses the cache memory 13 to obtain the particular page data.

In a job, the processor 11 intends to access the page data including the specific page. Therefore, the processor 11 can carry out a data access at a high speed when the specific page is memorized in the cache memory 13.

In a job, the processor 11 may access the page data of another page, for example, the second page, after accessing the page data of the first page. In this case, the cache memory 13 must fetch the content of the second page after the processor 11 obtains the page data of the first page. As readily understood from the above description, the processor 11 can not carry out the data access at the high speed when the processor 11 uses a plurality of pages in the job.

Furthermore, the processor 11 may successively process the first through the N-th pages at a predetermined period. In this event, it is necessary to periodically memorize the first through the N-th pages in the cache memory 13. In case where the first through the N-th pages are periodically memorized in the cache memory 13, the processor 11 can not carry out data access at the high speed.

Figure 2:
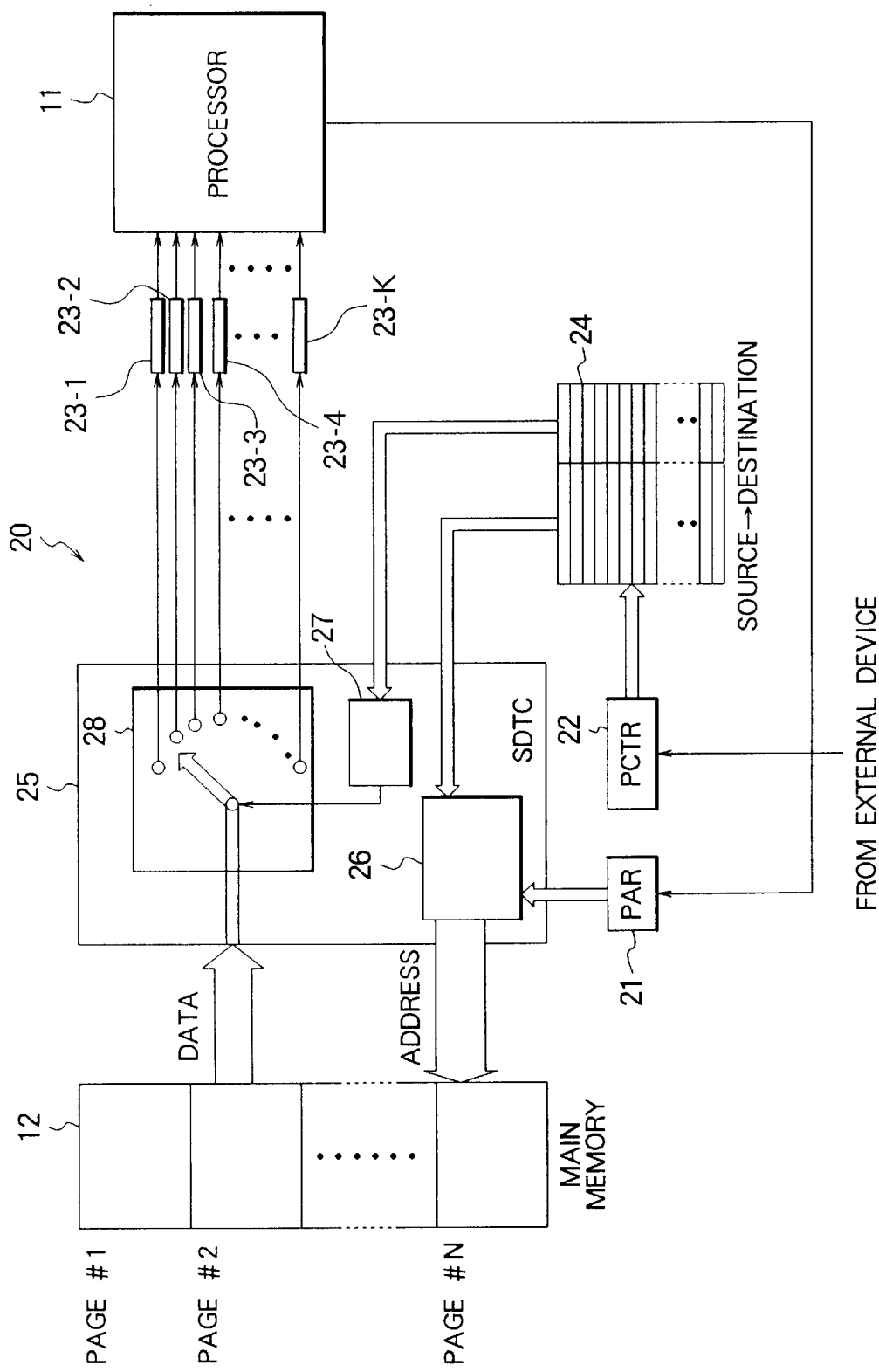
FIG. 2 is a block diagram for describing a fetching apparatus according to a preferred embodiment of this invention.

Referring to FIG. 2, description will proceed to a fetching apparatus according to a preferred embodiment of this invention. The illustrated fetching apparatus is designated by a reference numeral 20. The fetching apparatus 20 may be for use in the data processing system comprising the processor 11 and the main memory 12. The fetching apparatus 20 is located between the processor 11 and the main memory 12.

The fetching apparatus 20 comprises a page address register (PAR) 21, a page counter (PCTR) 22, first through K-th fetching registers (PFR) 23-1 to 23-K, where K represents a positive integer which is less than the positive integer M, a time-source-destination table (TSDT) 24, and a synchronous data transfer controller (SDTC) 25. The main memory 12 has the page structure comprising first through N-th pages #1 to #N each of which has page data in the number of M. More particularly, each of the first through the N-th pages has first through M-th page data.

The TSDT 24 stores table information which is representative of a relationship between offset addresses in each of the first through the N-th pages and the first through the K-th fetching registers 23-1 to 23-K. Each of the offset addresses may be called a transfer source. The TSDT 24 comprises a source area for memorizing the offset addresses in the number of K and a destination area for memorizing outlet port numbers corresponding to the offset addresses, respectively. More specifically, each of the first through the N-th pages has first through M-th offset addresses. Specific ones of the first through the M-th offset addresses are memorized in the source area. The number of the specific offset addresses is equal to the positive integer K.

The page address register 21 stores a specific page number as a stored page number which is indicative of one of the first through the N-th pages #1 to #N. The specific page number is supplied from the processor 11 to the page address register 21. The stored page number is renewed into a renewal page number by the processor 11 as will be described later.

The synchronous data transfer controller 25 comprises an address producing circuit 26, a switch control circuit 27, and a switching circuit 28. The stored page number is supplied from the page address register 21 to the address producing circuit 26. The page counter 22 is supplied with a start signal and a reset signal from an external device (not shown). Each of the start and reset signals are supplied to the page counter 22 at a predetermined period which may be equal to a processing time duration assigned to each page. The page counter 22 starts a count in response to the start signal and stops the count in response to the reset signal.

Supplied with the start signal, the page counter 22 starts a count to supply the TSDT 24 with a count signal representative of the count. Responsive to the count signal, the offset addresses and the outlet port numbers are successively read out of the TSDT 24.

It will be assumed that the page counter 22 produces first through K-th count signals during the predetermined period. The first through the K-th count signals are representative of first through K-th counts, respectively.

It will be assumed that an m-th offset address and a k-th outlet port number are read out of the TSDT 24 in response to a k count signal, where m represents a variable between one and M and k represents a variable between one and K, both inclusive. The m-th offset address corresponds to the k-th outlet port number. The m-th offset address is supplied to the address producing circuit 26. The k-th outlet port number is supplied to the switch control circuit 27.

As described above, the address producing circuit 26 is supplied with the stored page number from the page address register 21. Responsive to the stored page number, the address producing circuit 26 knows a page which should be fetched. More particularly, the address producing circuit 26 produces a main memory address in accordance with the stored page number and the m-th offset address in order to read m-th page data in the specific page out of the main memory 12.

Now, it will be assumed that the stored page number is the first page number #1. In this event, the m-th page data of the first page are read as m-th #1 page data out of the main memory 12 in accordance with the m-th offset addresses. The m-th #1 page data are supplied to the switching circuit 28.

As described above, the switch control circuit 27 is supplied with the k-th outlet port number. The switch control circuit 27 controls the switching circuit 28 in response to the k-th outlet port number. More specifically, the switch control circuit 27 controls the switching circuit 28 in response to the k-th outlet port number in order to make the switching circuit 27 supply the k-th #1 page data to a k fetching register 23-k. As a result, the k-th fetching resister 23-k fetches the m-th #1 page data.

In a manner described above, the first through the k-th fetching resisters 23-1 to 23-k fetch specific ones of the first through the M-th #1 page data or first through k-th page data, respectively. The processor 11 carries out a data processing in accordance with the first through the K-th page data which are fetched in the first through the K-th fetching registers 23-1 to 23-K, respectively. After the end of the data processing, the processor 11 supplies the page address register 21 with a page number needed in a next data processing. Namely, the processor 11 renews the stored page number into the renewal page number.

After the predetermined period lapses, the page counter 22 is reset by the reset signal supplied from the external device. The page counter 22 is reset after the count reaches to the K-th count. The page counter 22 again starts the count in response to the start signal.

As described above, the synchronous data transfer controller 25 carries out a data transfer from the main memory 12 to the first through the K-th fetching registers 23-1 to 23-K. After the predetermined period lapses, the processor 11 renews the stored page number into the renewal page number. The fetching apparatus 20 fetches the page data in accordance with the renewal page number.

What is claimed is:

1. A fetching apparatus for use in a data processing equipment having a main memory and a processor, said main memory having a page structure comprising a plurality of pages, each page containing a plurality of specific page data, each of said specific page data having a respective specific address; said fetching apparatus cooperating with said main memory and said processor to fetch said specific page data of a specific one of said at least one of a plurality of said pages from said main memory and to supply said specific page data from at least one of said plurality of pages to said processor, said fetching apparatus comprising:

memory means having a plurality of memory areas each of which is for memorizing said specific page data from at least one of said plurality of pages as fetched page data;

table means having a source column for memorizing offset addresses relating to said specific addresses of said specific page data in each of said pages and a destination column for memorizing indicators indicating corresponding ones of said plurality of memory areas corresponding to the offset addresses, as data transfer locations; and reading means responsive to said source column of said table means for reading said specific page data of said page out of said main memory as read page data and said reading means responsive to said destination column of said table means for placing said read page data in a corresponding one of said plurality of memory areas of said memory means as fetched page data.

2. A fetching apparatus as claimed in claim 1, wherein said memory means comprises a plurality of registers each of which is used as said memory area.

3. A fetching apparatus as claimed in claim 2, wherein said fetching apparatus further comprises:

a page address register for indicating said specific page; and a page counter for counting a count during a predetermined period to produce a count signal representative of said count, a pair of said address and said data transfer location are synchronously read as a read address and a read data transfer location out of said table means in accordance with said count signal.

4. A fetching apparatus as claimed in claim 3, wherein said reading means comprises:

accessing means for accessing said main memory in accordance with said specific page and said read address to read said read page data out of said main memory; and transferring means for transferring said read page data to a specific one of said registers in accordance with said read data transfer location to fetch said read page data as said fetched page data in said specific register.

5. A fetching apparatus as claimed in claim 1, wherein said reading means fetches said read page data as said fetched page data to said specific area in synchronism with a specific one of said addresses and a specific one of said data transfer locations.

6. A fetching apparatus interacting with a main memory and a processor for memorizing specific information on a specific page comprising:

a memory having plural memory areas;

a table having a source column storing an offset address relating to said specific information on said specific page, and a destination column storing a corresponding indicator of one of said memory areas corresponding to the offset address a reading means responsive to said source column of said table means for reading said specific information on said specific page; and a transferring means for transferring said specific information of said specific page to the memory are indicated by said indicator in said destination column.

* * * * *